(12) United States Patent
Baddepuri et al.

(10) Patent No.: US 11,567,799 B2
(45) Date of Patent: Jan. 31, 2023

(54) SYSTEM AND METHOD FOR UPDATING APPLICATIONS WITH CURRENT INSTANCE CONFIGURATIONS IN REAL-TIME

(71) Applicant: salesforce.com, inc., San Francisco, CA (US)

(72) Inventors: Kranthi Baddepuri, Hyderabad (IN); Siang Hao Darren Poh, Bedok (SG)

(73) Assignee: Salesforce, Inc., San Francisco, CA (US)

( * ) Notice: Subject to any disclaimer, the term of this patent is extended or adjusted under 35 U.S.C. 154(b) by 104 days.

(21) Appl. No.: 16/919,863

(22) Filed: Jul. 2, 2020

(65) Prior Publication Data
US 2021/0208937 A1 Jul. 8, 2021

(30) Foreign Application Priority Data
Jan. 3, 2020 (IN) .............................. 202041000213

(51) Int. Cl.
*G06F 9/50* (2006.01)
*G06F 9/54* (2006.01)

(52) U.S. Cl.
CPC ................ *G06F 9/50* (2013.01); *G06F 9/547* (2013.01)

(58) Field of Classification Search
CPC ................................ G06F 9/5011; G06F 9/547
See application file for complete search history.

(56) References Cited

U.S. PATENT DOCUMENTS

| 10,884,732 B1* | 1/2021 | Zolotow | G06F 8/76 |
| 2009/0037367 A1* | 2/2009 | Wein | G06F 9/5061 |
| 2017/0026416 A1* | 1/2017 | Carpenter | H04L 41/0866 |
| 2018/0373456 A1* | 12/2018 | De Schrijver | G06F 3/061 |
| 2021/0006637 A1* | 1/2021 | Hilber | H04L 43/045 |

* cited by examiner

*Primary Examiner* — Emerson C Puente
*Assistant Examiner* — Jonathan R Labud
(74) *Attorney, Agent, or Firm* — Sterne. Kessler Goldstein & Fox P.L.L.C.

(57) ABSTRACT

Described herein is a system and method for determining the status of instances and update applications to reflect the updated statuses of instances, in real-time. In an embodiment, each instance may enable a service to determine the status of an instance. A core application server may load server pool configurations including a status of an instance. The status indicates the instance is live. Core application server may read a gate definition of the instance using the service enabled on the instance. Core application server may determine that a current status of the instance is virtual, based on the gate definition of the instance. The core application may a local cache of core application server to reflect that the current status of the instance is virtual and propagate to applications executed on other instances and core application server.

20 Claims, 6 Drawing Sheets

SYSTEM AND METHOD FOR UPDATING APPLICATIONS WITH CURRENT INSTANCE CONFIGURATIONS IN REAL-TIME

CROSS-REFERENCE TO RELATED APPLICATIONS

This application claims priority to Indian Provisional Patent Application No: 202041000213, filed Jan. 3, 2020, the contents of which are incorporated herein in their entirety.

BACKGROUND

Collections of computing resources such as databases, application servers, rack nodes, or the like, are often used to host applications for various clients. Each collection of computing resources may be referred to as an instance. In the event an instance has reached its capacity or is no longer able to process or store data, the instance becomes a virtual instance that is now defunct and the data hosted by the virtual instance may be transferred into a new instance. The applications which need to access the now virtual instance need to be updated to reflect the updated configuration so that the applications access the new instance.

Conventionally, when updating the status of an instance, a core application server's configuration would need to be updated. This requires the core application to be restarted causing a significant amount of downtime. This time-consuming process is not desirable for meeting the time-critical and time-sensitive requirements for the application config changes to be deployed to the desired fleet of production instances. This process may also be expensive for clients and customers hosting their applications on the instances.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Figure 1:
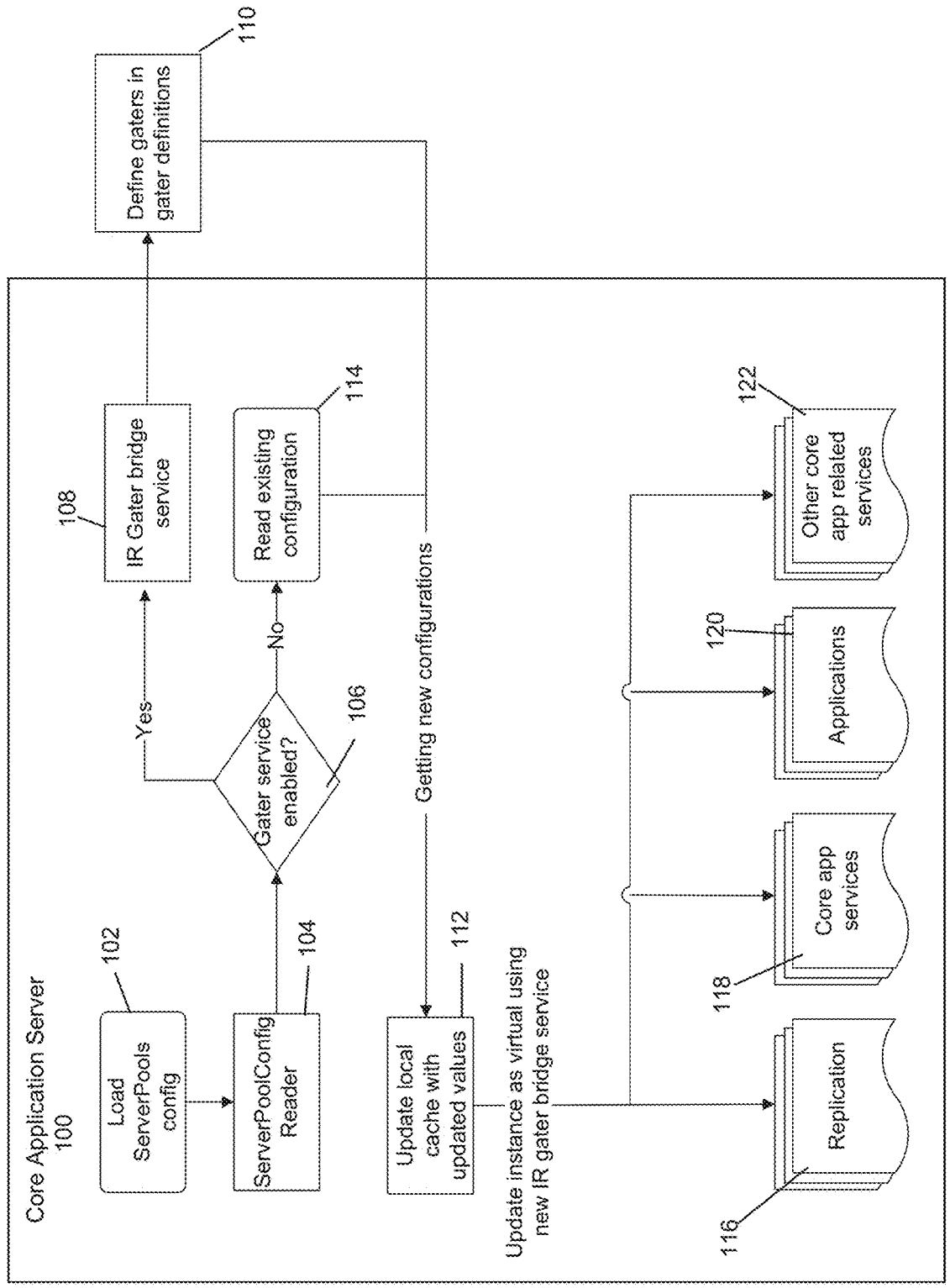
FIG. 1 is a flowchart illustrating a process for updating applications to reflect current instance configurations in real-time, according to an example embodiment.

Provided herein are system, apparatus, device, method and/or computer program product embodiments, and/or combinations and sub-combinations thereof for updating applications with current instance configurations in real-time.

As described above collections of computing resources including application servers, databases, rack nodes, or the like are used to host applications for various clients. Each collection of computing resources is referred to as an instance or pod. When an instances' hardware (e.g., databases, application servers, rack nodes, etc.) has reached its capacity or is unable to process any further data, an instant refresh (IR) may be executed. During the IR, the data stored on the instance may be transferred to a new instance and the instance may be decommissioned. The decommissioned instance may be referred to as a virtual instance.

Numerous applications hosted on the various instances or a core application server may need to access the data of the now virtual instance. However, the various applications may still attempt to access a live instance rather than the virtual instance. As the live instance has been decommissioned, attempting to access the live instance may cause an exception. In light of this, the applications which need to access the virtual instance may need to be updated with the new status of the virtual instance.

Conventionally to update the status of the virtual instance a two-phase process would be executed. In the first phase, an app config override file would be deployed followed by a restart of core application server. In the second phase, an emergency release request (ERR) would be executed followed by a standard release deployment. Core application server invokes application restarts in each instance, in a rolling manner, so that each application may receive and reflect the updated status of the virtual instance. Due to the time that each application takes to be restarted, the overall time required for each instance to have the required status of the virtual instance is undesirably long. This may cause downtimes that could for 15 or more minutes. This time-consuming process is very expensive for clients and customers using the instances to host their application.

The system described herein is able to determine the status of instances and update applications to reflect the updated statuses of instances, in real-time. In an embodiment, a core application server may load a configuration including a status of a collection of computing resources on a server and an instruction to poll a service of the collection. The status indicates whether the collection is live. The collection of computing resources can be an instance. Core application server polls the service of the collection to determine a gate definition of the collection. Core application server may determine that a current status of the collection is virtual, based on the gate definition of the collection. Core application server may load the gate definition of the collection to a local cache of core application server to reflect that the current status of the collection is virtual. Core application server propagates the current the gate definition to an application executed on a different collection of computing resources (e.g., different instance) to apply the current status of the collection to the application while the application is being executed.

The system eliminates the need for restarting core application server or the applications being executed by core application server by being able to determine the status of the instance when the status is changed. This further eliminates the rolling restart. Furthermore, the system allows for core application server to handle real-time updates of the instances.

FIG. 1 is a flowchart illustrating a process for updating applications to reflect current instance configurations in real-time, according to an exemplary embodiment. In an embodiment, a core application server 100 may support or execute applications hosted by various instances. The instances may host applications for various clients. When a call or request is transmitted to any of the applications, the core application can direct the call or request is first received by core application server 100. The core application 100 server may identify the application for which the call or request was directed and redirect the call or request to the appropriate instance.

As described above, an instance can be a collection of computing resources. In particular, an instance may include hardware such as application servers, databases, rack nodes, or the like. Furthermore, an instance may host data for executing applications for different clients. An instance may host application data for more than one client. Alternatively, or in addition to, multiple different instances may host application data for a single client.

In the event, the hardware of an instance reaches its capacity and is unable to process any further application data and instance refresh (IR) is executed on the instance. The IR causes the application data hosted by the instance (source instance) to be transferred to a new instance (target instance). The IR may take around 2 hours to complete. During the IR process, the source instance is still live, however, it is only accessible in read-only mode. That is new data may not be written in the source instance, however, data may be read from the source instance. After the IR process is completed, the status of the source instance changes from live to virtual and the target instance becomes live to host the application data previously hosted by the source instance.

Core application server 100 may support or execute different applications. The applications may need to access to each of the instances. However, if an application attempts to access an instance that is now a virtual instance, the application may receive an exception. In this regard, it is important the applications receive an updated status of the instance so that the applications do not attempt to access a virtual instance with the understanding that it is a live instance.

In an embodiment, in operation 102, core application server 100 may load server pool configurations. The server pool configurations may include server ids and the status of each of the instances. As an example, the server pool configurations may indicate a status a given instance is live. However, the given instance may have been through an IR process and may be a virtual instance. In this regard, the server pool configuration may reflect an older status of the instance. The server pool configuration may include a configuration for the instance that indicates that a gater service of the instance should be polled to determine the current status of the instance. This configuration may be triggered when the IR process is completed on the instance.

In operation 104, a server pool configuration reader may poll the gater service for the given instance to determine whether the gater service is enabled for the given instance. The gater service may be a service included in each instance. The gater service may be a service that can determine the status of an instance while the instance is in production. The gater service is configured to generate a gate definition for the given instance once the IR process is scheduled for the given instance. The gate definition may include a current status of the instance when the IR process is completed and the new target instance receiving the application data hosted by the particular application.

In operation 106, the server pool config may determine whether the gater service is enabled. The server pool configuration may indicate whether the gater service is enabled for a given instance. The gater service may be enabled in the event the status of a given instance is being updated.

In operation 108, in response to determining the gater service is enabled an IR gater bridge service may read the gate definition of the given instance. The IR gater bridge service may compare the status of the instance indicated in the server pool configurations and the current status indicated in the gate definitions. The IR grater bridge service may determine that the status of the instance is virtual.

In operation 110, the gate definition of the given instance may be transmitted to a local cache of core application server 100. As described above, the gate definition of the given instance may include the current status of the instance.

In operation 112, the gate definition of the given instance may be propagated to all the applications supported or executed by core application server 100. The applications may include replication 116, core app services 118, applications 120, and other core app-related services 122. The gate definition may also be propagated to applications executed by other instances. The gate definition of the given instance is applied by the applications so that each application calls on the correct instance.

In operation 114, in the event the gater service is not enabled for the given instance, core application server 100 reads the existing configuration or status of the instance. Core application server 100 may read the status of the given instance from XML file such as serverpool.xml.

Figure 2:
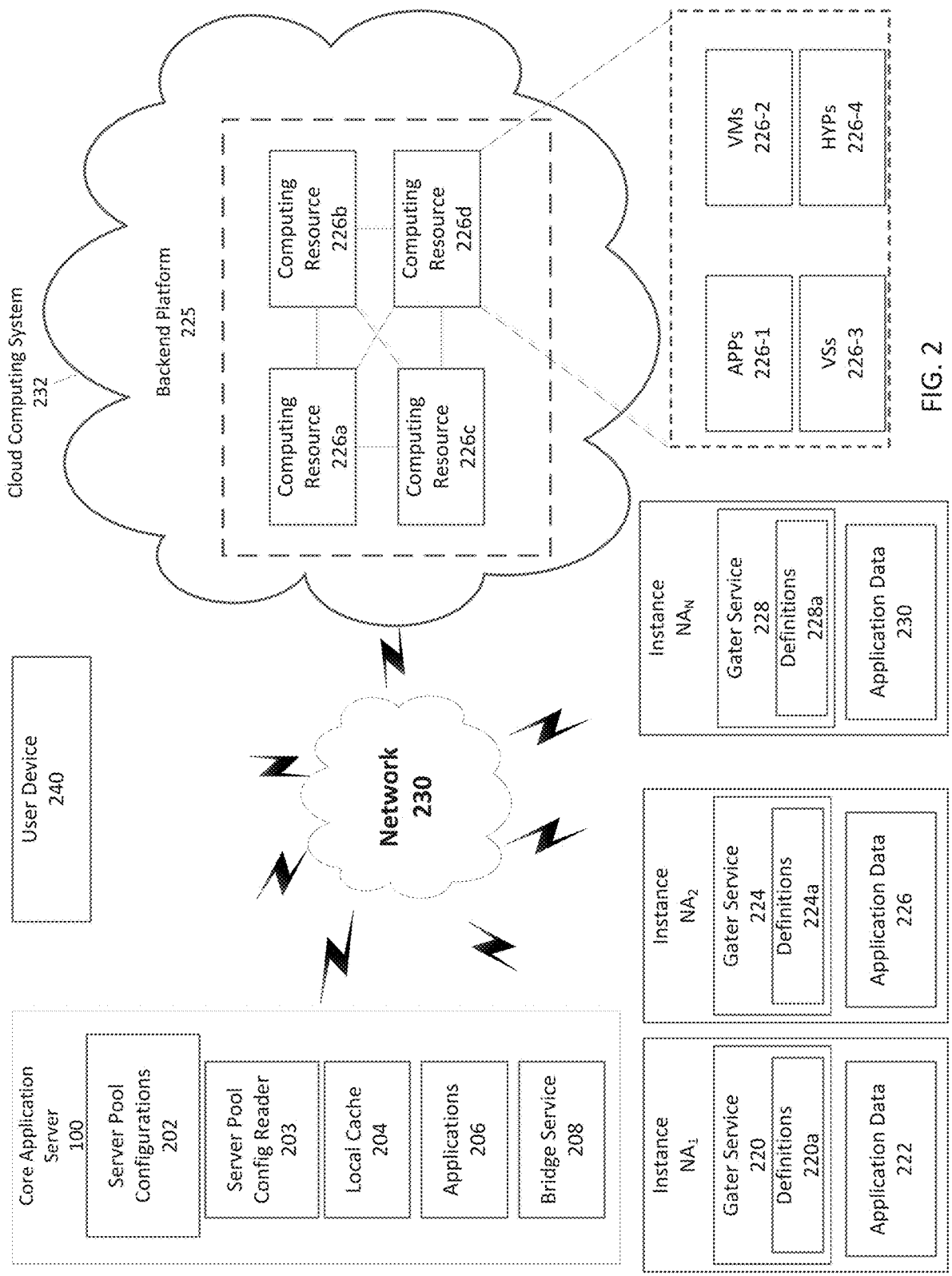
FIG. 2 is a block diagram of an example environment in which systems and/or methods described herein may be implemented according to an example embodiment.

FIG. 2 is a block diagram of an example environment in which systems and/or methods described herein may be implemented. The environment may include a core application server 100, instances $NA_1$ through $NA_N$, a user device 240, a backend platform 125, a cloud computing environment 132, and a network 230. The devices of the environment may be connected through wired connections, wireless connections, or a combination of wired and wireless connections.

In an example embodiment, one or more portions of the network 230 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 225 may include a server or a group of servers. In an embodiment, the backend platform 225 may be hosted in a cloud computing environment 232. It may be appreciated that the backend platform 225 may not be cloud-based, or may be partially cloud-based. Core application server 100 and instances $NA_1$ through $NA_N$ may reside fully or partially in the cloud computing environment 232. Alternatively, core application server 100 and instances $NA_1$ through $NA_N$ may reside outside of the cloud computing environment 232.

Core application server 100, instances $NA_1$ through $NA_N$, and user device 240, may include one or more devices configured to interface with the backend platform 225. Core application server 100 may include server pool configurations 202, server pool configuration reader 204, local cache 204, applications 206, and a bridge service 208. The server pool configurations 202 may include the server information and statuses of the instances. The applications 206 may be various applications executed and supported by core application server 100. The applications 206 may include replication, core app services, applications, and other application-related services (as shown in FIG. 1). The bridge service 208 may be an IR bridge service configured to read status information from gate definitions of the instances.

Each of the instances $NA_1$ through $NA_N$ may be made up of a collection of hardware including, application servers, databases, rack nodes, or the like. Each of the instances $NA_1$ through $NA_N$ may be configured to store and host data for executing applications for various customers or clients. Each of the instances $NA_1$ through $NA_N$ may host data for more than one customer or client. Additionally, multiple different instances may host the data for a single customer or client. This way each of the instances $NA_1$ through $NA_N$ may be storing application data for more than one customer or client, while the data for the client may be split along multiple instances.

Instance $NA_1$ may include a gater service 220 and application data 222. The gater service 220 may be configured to determine and assign gate definition for the instance $NA_1$. The gater service 220 may include definitions 220a which may store the gate definitions for the instance $NA_1$. The application data 222 may be the data for executing applications hosted by instance $NA_1$.

Instance $NA_2$ may include gater service 224 and application data 226. The gater service 224 may be configured to determine and assign gate definition for the instance $NA_2$. The gater service 224 may include definitions 224a which may store the gate definitions for the instance $NA_2$. The application data 226 may be the data for executing applications hosted by instance $NA_2$.

Instance $NA_N$ may include gater service 228 and application data 230. The gater service 228 may be configured to determine and assign gate definition for the instance $NA_N$. The gater service 228 may include definitions 228a which may store the gate definitions for the instance, $NA_N$. The application data 230 may be the data for executing applications hosted by instance, $NA_N$.

The cloud computing environment 232 includes an environment that delivers computing as a service, whereby shared resources, services, etc. may be provided to the user device 240 and/or the backend platform 225. The cloud computing environment 232 may provide computation, software, data access, storage, and/or other services that do not require end-user knowledge of a physical location and configuration of a system and/or a device that delivers the services. The cloud computing system 232 may include computing resources 226a-d.

Each computing resource 226a-d includes one or more personal computers, workstations, computers, server devices, or other types of computation and/or communication devices. The computing resource(s) 226a-d may host the backend platform 225. The cloud resources may include compute instances executing in the computing resources 226a-d. The computing resources 126a-d may communicate with other computing resources 126a-d via wired connections, wireless connections, or a combination of wired or wireless connections.

Computing resources 226a-d may include a group of cloud resources, such as one or more applications ("APPs") 226-1, one or more virtual machines ("VMs") 226-2, virtualized storage ("VS") 226-3, and one or more hypervisors ("HYPs") 226-4. The virtual machines 226-2 and virtualized storage 226-3 may be separate and distinct from virtual instances.

Application 226-1 may include one or more software applications that may be provided to or accessed by user device 240. The application 226-1 may eliminate a need to install and execute software applications on the user device 240. The application 226-1 may include software associated with backend platform 225 and/or any other software configured to be provided across the cloud computing environment 232. The application 226-1 may send/receive information from one or more other applications 226-1, via the virtual machine 226-2.

Virtual machine 226-2 may include a software implementation of a machine (e.g., a computer) that executes programs like a physical machine. Virtual machine 226-2 may be either a system virtual machine or a process virtual machine, depending upon the use and degree of correspondence to any real machine by virtual machine 226-2. A system virtual machine may provide a complete system platform that supports execution of a complete operating system (OS). A process virtual machine may execute a single program and may support a single process. The virtual machine 226-2 may execute on behalf of a user and/or on behalf of one or more other backend platforms 225 and may manage the infrastructure of the cloud computing environment 232, such as data management, synchronization, or long-duration data transfers. The virtual machine 226-2 may not be included in a virtual instance.

Virtualized storage 226-3 may include one or more storage systems and/or one or more devices that use virtualization techniques within the storage systems or devices of computing resource 226a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations. The virtualized storage 226-3 may not be included in a virtual instance.

Hypervisor 226-4 may provide hardware virtualization techniques that allow multiple operations systems (e.g., "guest operating systems") to execute concurrently on a host computer, such as computing resource 226a-d. Hypervisor 226-4 may present a virtual operating platform to the guest operating systems and may manage the execution of the guest operating systems multiple instances of a variety of operating systems and may share virtualized hardware resources.

In an embodiment, each of the instances $NA_1$ through $NA_N$ may store application data 222, 226, and 230, for executing applications for different clients. As a non-limiting example, user device 240 may attempt to access a client's application by navigating to login.companyname.com. Core application server 100 may receive a request from the user device 240 to access the client's application, in response to the user device 240 navigating to login.companyname.com. Core application server 100 may query the server configuration pool 202 to identify which instance of the instances $NA_1$ through $NA_N$ is configured to process the login for companyname. Core application server 100 may replace the word "login" with the name of the instance. In other words, if instance $NA_1$ is responsible for processing the logins for companyname, then core application server 100 may redirect the user device 240 to $NA_1$.companyname.com.

The instances $NA_1$ through $NA_N$ may process such requests using hardware of one or more of instances $NA_1$ through $NA_N$ and application data 222, 226, and 230. Using the earlier example, application data 222 may include login information for users associated with a particular client. Instances $NA_1$ may process the login request for a user associated with a particular client using the application data 222. In an embodiment, the hardware of the instances $NA_1$ through $NA_N$ may reach its storage capacity or may be unable to process any further data. In this case, the instance that has reached its storage capacity or may be unable to process any further data may require maintenance or may need to be decommissioned. An instance refresh (IR) process may be scheduled for the instance. During the IR process, the instance may become a source instance and the application data hosted by the source instance may be transferred to a new instance (or target instance). Once the IR is completed, the source instance may no longer be live and will become virtual, and the target instance will become live for hosting the application data previously hosted by the source instance.

The server pool configuration may include a configuration for each of the instances with a default value of "false". The configuration indicates whether to poll the gater service of the instance. When set to "true", the value of virtual pod configuration will be polled from the gater service of the instance. In response to completing an IR for a given instance, the configuration may be set to true. This way, each time a call is made to the given instance, the gater service for the given instance will be polled to determine the status of the given instance. As a non-limiting example, the configuration may be a Boolean value named "useGaterforisVirtual".

When the given instance is scheduled to be refreshed the gater service for the given instance may generate a gate definition for the given instance. The gate definition may include a name, whether the definition is enabled, description, teamID, date it was last modified, activation strategy, or the like. The name may be as follows: com.companyname.<instanceName>.isVirtual. The gater definition may further include the environment, current timestamp, expected date and time of the completion of the IR. Furthermore, the gater definition may include the new (target) instance replacing the given instance.

As a non-limiting example, the gate definition may include the name of the given instance, the status of the instance, whether the gater definition is enabled, a description, team ID, user that last modified the definition, activation strategy, name of a new instance taking over the responsibilities the given instance, or the like.

As a non-limiting example, instance $NA_1$ may reach its maximum storage capacity and may be unable to process any further data, requiring an IR to be executed on instance $NA_1$. The application data 222 from instance $NA_1$ may be scheduled to be transferred to $NA_N$. That is instance $NA_N$ is the target instance and will host the applications previously hosted by instance $NA_1$. The gater service 220 may generate a gate definition for instance $NA_1$. The gate definition may indicate that the instance $NA_1$ will become virtual after the IR is completed as well as an indication that instance $NA_N$ will be the new target instance to host the applications previously hosted by instance $NA_1$. The gate definition may be stored in definitions 220a.

In response to completing the IR, core application server 100 may update the configuration indicating whether to poll the gater service, for instance, $NA_1$ to "true", in the server pool configurations 202. In the event core application server 100 receives a call to instance $NA_1$, core application server 100 may load the server pool configurations 202. The server pool configurations 202 may indicate that the status of the instance $NA_1$ is live. Furthermore, the server pool configurations 202 may indicate that the gater service 220 of instance $NA_1$ should be polled.

In response to determining that the gater service 220 of instance $NA_1$ should be polled, the server pool configurations reader 203 may determine whether the gater service 220 is enabled for instance $NA_1$. In response to determining the gater service 220 is enabled for instance $NA_1$, the bridge service 208 may read the gate definition of instance $NA_1$ from definitions 220a. The bridge service 208 may compare the status of instance $NA_1$ in the server pool configurations with the status of the instance $NA_1$ in the gate definition. The bridge service 208 may determine that the status of instance $NA_1$ is virtual and that instance $NA_N$ is the target instance. In this regard, the bridge service 208 may determine that the application data 222 of instance $NA_1$ is being transferred to instance $NA_N$ and instance $NA_N$ will be hosting the applications of clients previously hosted by instance $NA_1$.

The gate definition of instance $NA_1$ may be transferred to the local cache 204. Core application server 100 may propagate the gate definition of instance $NA_1$ to applications 206. The applications 206 may include replication, core app services, applications, and other app-related services. Each of the applications 206 may in some way attempt to access instance $NA_1$. For example, in the event, a client creates a user account for their application hosted by one or more of the instances $NA_1$ through instance $NA_N$. Replication may transmit the information regarding the new account to all of the instances which may host application data for the particular application. If replication attempts to transmit the information to instance $NA_1$, replication may receive an exception because instance $NA_1$ is virtual. Therefore, when core application server 100 propagates the gate definition of instance $NA_1$, replication does not attempt to transmit the information to a live instance $NA_1$. Rather, replication transmits the message to instance $NA_N$.

In response to requests being directed to instance $NA_1$, the Canonical Name Record (CNAME) for instance $NA_1$ (instance $NA_1$.companyname.come) may be redirected to Virtual Instance VIP *viv.companyname.com*. The requests made to instance $NA_1$ are injected with a header that tells AppRouter to process (proxy) the requests to the correct target instances (instance $NA_N$).

In an embodiment, when an instance is being decommissioned, the application stored in the instance may be split among more than one instance. For example, in the earlier example, the application data 222 may be split among instance $NA_2$ and instance $NA_N$.

Figure 3:
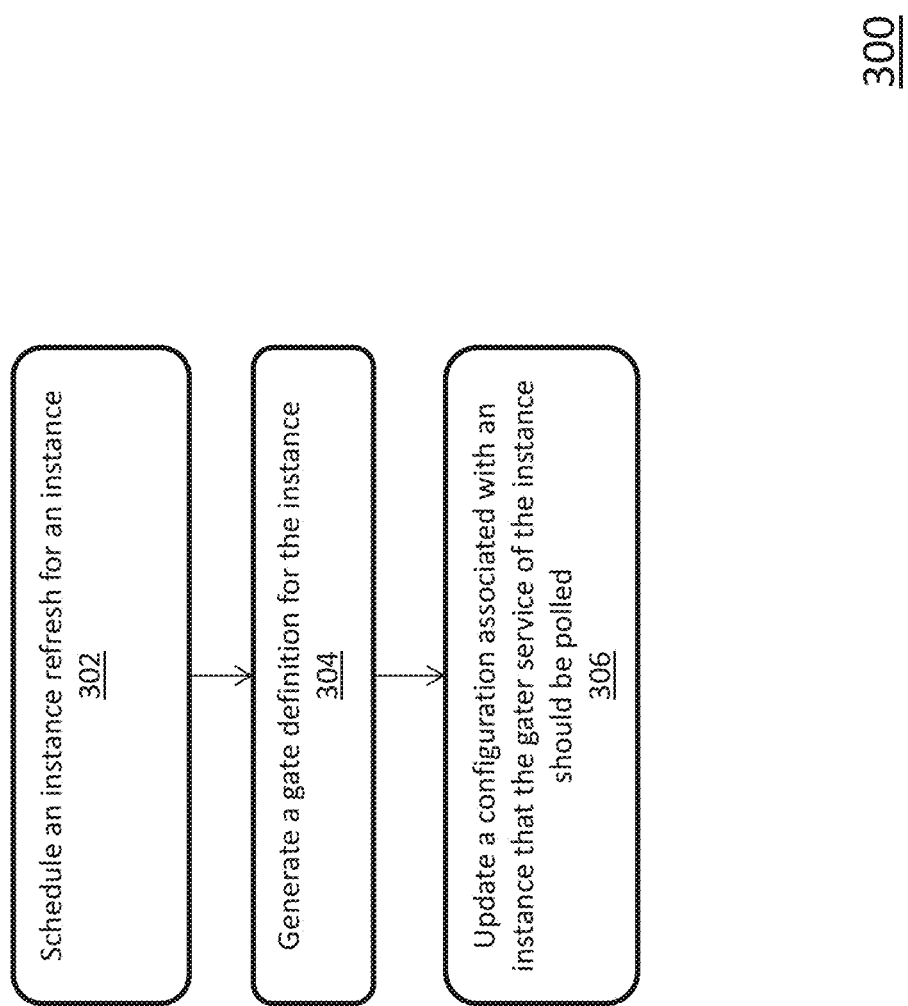
FIG. 3 is an example flowchart for executing an instance refresh on an instance according to an example embodiment.

FIG. 3 is a flowchart illustrating a process for executing an instance refresh on an instance according to an example embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 3, as will be understood by a person of ordinary skill in the art.

Method 300 shall be described with reference to FIGS. 1-2. However, method 300 is not limited to that example embodiment.

In operation 302, a core application server 100 schedules an instance reference (IR) an instance which has reached its capacity or is unable to process any further data. As described above an instance can be a collection of computing resources. For example, an instance can host application data for executing applications for a client. The instance can include hardware elements such as databases, applications servers, rack nodes, or the like. The hardware of an instance may reach its capacity for storing or processing information. In this event, an IR may be scheduled for the instance. The IR process may transfer the application data hosted by the instance to a new instance.

In operation 304, a gater service generates a gate definition for the instance. Each instance may include a gater service. The gater service may identify a current status of the instance while in production. The gater service may generate a gate definition based on the status of the instance. The gater definition indicates when the status of the instance will change from live to virtual when the IR is completed.

In operation 306, core application server 100 updates a configuration associated with an instance that the gater service of the instance should be polled to determine the status of the instance, in response to an IR being executed and completed on the instance. Core application server 100 may support applications executed by the instances. Core application server 100 may include a server poll configuration file that stores the configurations of all instances and their status.

Figure 4:
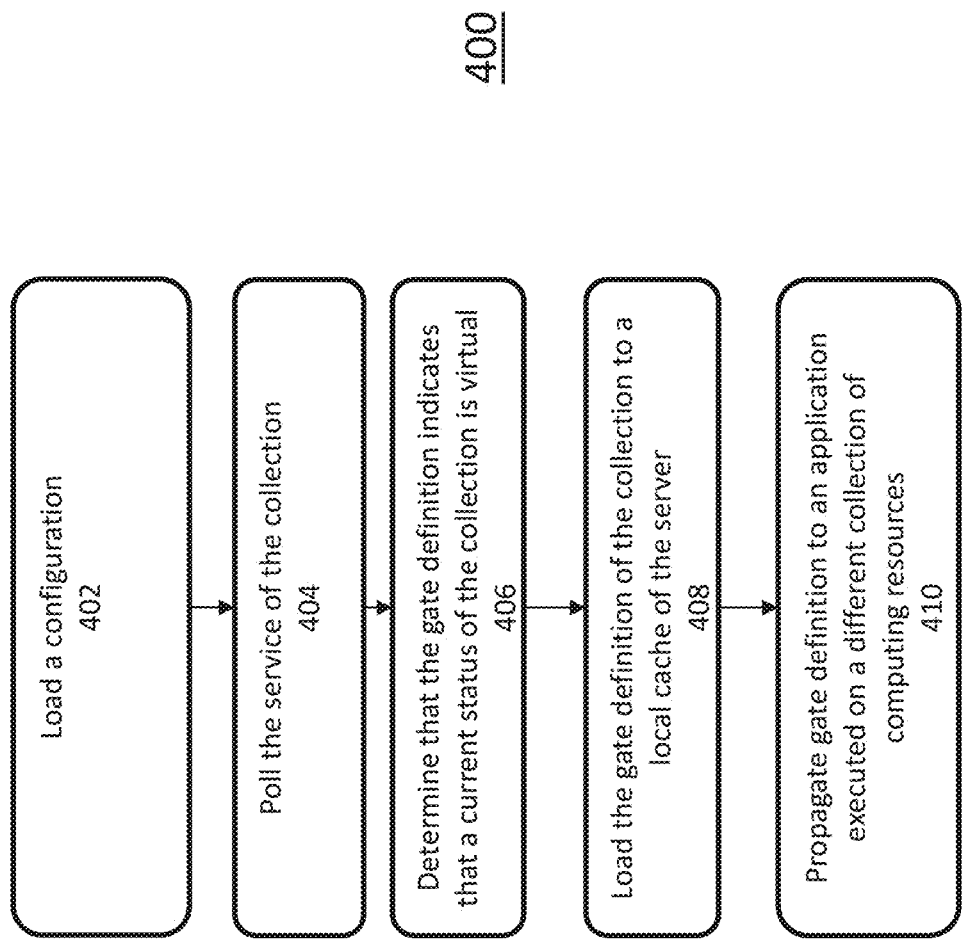
FIG. 4 is an example flowchart for updating applications with the current instance configurations, in real-time, according to an example embodiment.

FIG. 4 is a flowchart illustrating a process for updating applications with the current instance configurations, in real-time. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIGS. 1-2. However, method 400 is not limited to that example embodiment.

In operation 402, core application server 100 loads a configuration including a status of a collection of computing resources on a server and an instruction to poll a service (e.g., gater service) of the collection. The collection may be an instance. Core application server 100 may support applications being executed on various instances. As an example, core application server 100 may receive a request directed to the above-mentioned instance. Core application server 100 may load the server pool configurations to determine the configuration and status of the instance. The server pool configurations may include the configurations and statuses of all of the instances. The status of the instance may be listed as live in the server pool configurations. Furthermore, a configuration may be defined in the server pool configuration for the instance. The configuration may include an instruction for the core application server 100 to poll the gater service for the status of the instance. This configuration may be defined when an IR process is executed on an instance. The IR process transfers application data hosted by the instance to a new instance when the instance has reached its capacity for storing and processing application data.

In operation 404, server pool configuration reader 203 polls the service of the collection to determine a gate definition of the collection, in response to reading the instruction to poll the service of the collection. Server pool configuration reader 203 may be configured determine whether the gater service is enabled for the instance based on a configuration defined in the server pool configurations for the instance. The configuration may instruct core application server 100 to poll the gater service of the instance to determine the status of the instance. Each instance may include a gater service. The gater service may identify a current status of the instance while in production. The gater service may generate a gate definition based on the status of the instance.

In operation 406, bridge service 208 determines that the gate definition indicates that a current status of the collection is virtual. Bridge service 208 may read the gate definition to determine the current status of the collection. The gate definition may be generated by the gater service.

In operation 410, bridge service 208 loads the gate definition of the collection to local cache 204 of core application server 100. As such, local cache 204 reflects the current status of the instance is virtual.

In operation 412, core application server 100 propagates the gate definition to an application executed on a different collection of computing resources (e.g., different instances) to apply the current status of the collection to the application while the application is being executed. The applications executed on other instances and the core application may attempt to access the instance as a live instance. However, as the instance has become virtual if the applications attempt to access the instance as a live instance, the application may receive an exception or an error. In light of this, the gate definitions of the instance are propagated to the applications so that the applications do not attempt to access the instance as a live instance.

Figure 5:
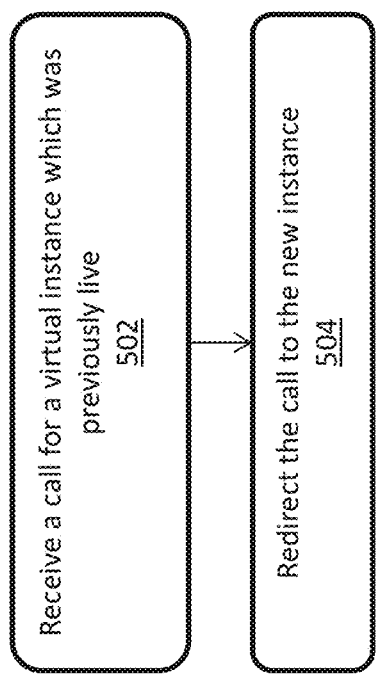
FIG. 5 is an example flowchart for re-directing requests to the correct instance, according to an example embodiment.

FIG. 5 is a flowchart illustrating a process for redirecting requests to the correct instance. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIGS. 1-2. However, method 500 is not limited to that example embodiment.

In operation 502, core application server 100 receives a call for instance which is now virtual which was previously live. The instance is a collection of computing resources. The instance hosted application data for executing applications of various clients. Once the instance reaches its storage or processing capacity, an IR process may be executed on the instance. The IR process transfers the application data from the instance to the new instance. The new instance (e.g., new collection of computing resources) may host the applications that previously live instance used to host. At the time of the IR, the process is scheduled for the instance, a gate definition may be generated for the instance. The gate definition may indicate a current status of the instance and the new instance receiving the application data from the instance. In this regard, once the IR process is completed, the current status may indicate the instance is virtual.

In operation 504, core application server 100 redirects the call to the new instance based on the gate definition of the virtual instance. As described above, the gate definition may indicate the current status of the instance as well as the information about the new instance receiving the application data from the instance.

Figure 6:
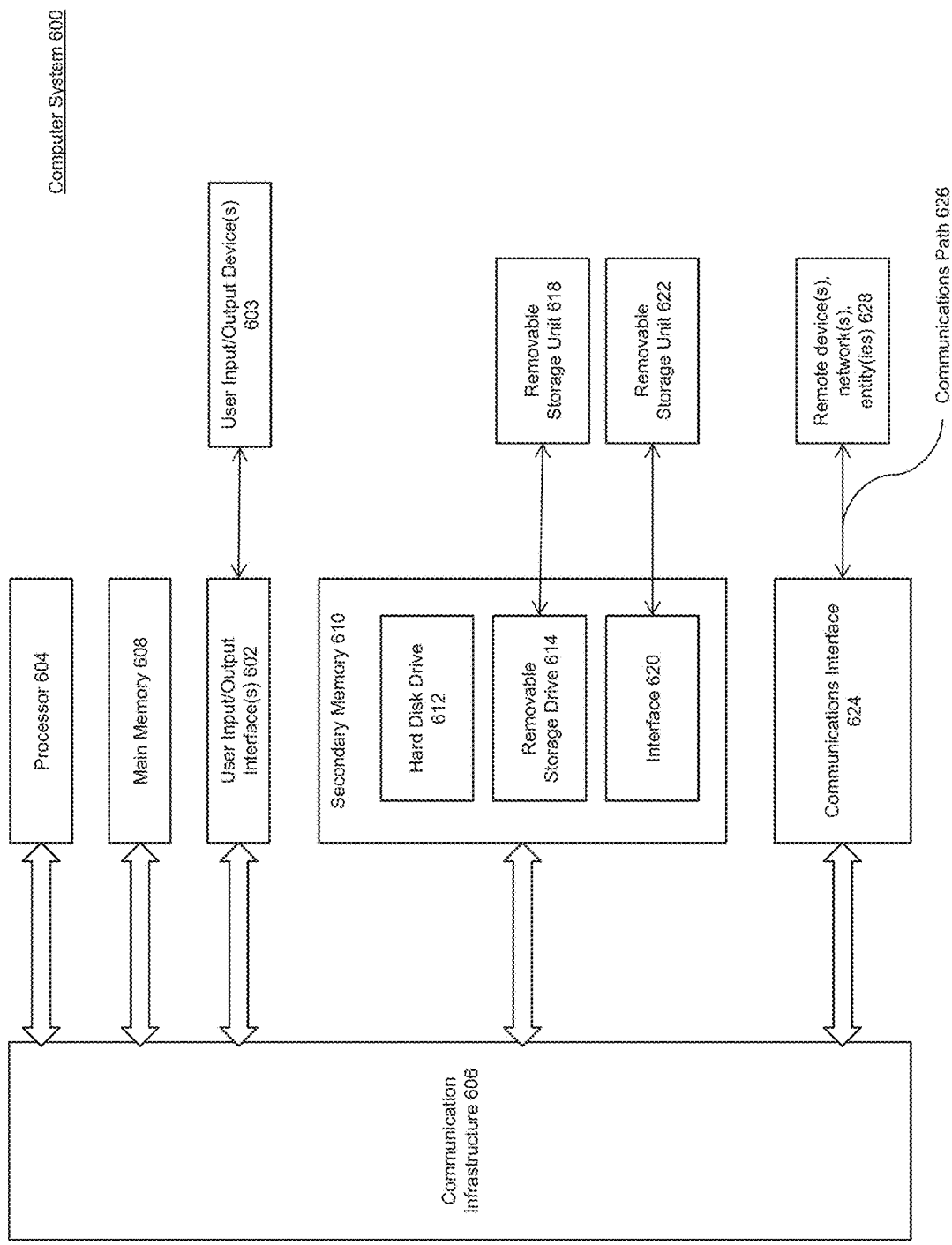
FIG. 6 is a block diagram of example components of a computing system according to an embodiment.

FIG. 6 is a block diagram of example components of device 600. One or more computer systems 600 may be used, for example, to implement any of the embodiments discussed herein, as well as combinations and sub-combinations thereof. Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 308, such as random access memory (RAM). Main memory 308 may include one or more levels of cache. Main memory 308 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614.

Removable storage drive 614 may interact with a removable storage unit 618. Removable storage unit 618 may include a computer-usable or readable storage device having stored thereon computer software (control logic) and/or data. Removable storage unit 618 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method for identifying configuration changes, the method comprising:
    loading, by one or more computing devices, a configuration for a first collection of computing resources on a server including an instruction to poll a service of the first collection;
    polling, by the one or more computing devices, the service of the first collection to determine a gate definition of the first collection in response to reading the instruction to poll the service of the first collection;
    loading, by the one or more computing devices, the gate definition of the first collection to a local cache of the server in response to the gate definition indicating a transfer of application data from the first collection to a second collection of computing resources has occurred; and
    propagating, by the one or more computing devices, the gate definition to an application executed on a third collection of computing resources to apply a change in a status of the first collection, resulting from the transfer, to the application while the application is being executed.

2. The method of claim 1, wherein the configuration further includes a current status of the first collection and wherein the change in status resulting from the transfer of application data to the second collection updates the current status of the first collection from live to virtual.

3. The method of claim 2, wherein the application data in the first collection is transferred to the second collection in the event of the first collection reaching its capacity.

4. The method of claim 2, wherein the gate definition of the first collection includes information associated with the second collection.

5. The method of claim 2, further comprising:
    receiving, by the one or more computing devices, a call to the first collection; and
    re-directing, by the one or more computing devices, the call to the second collection.

6. The method of claim 2, further comprising comparing, by the one or more computing devices, the status of the first collection included in the configuration with the current status of the first collection based on the gate definition.

7. The method of claim 1, wherein the first collection includes servers, databases, application servers, and rack nodes.

8. A system for identifying instance configuration changes, the system comprising:
    a memory;
    a processor coupled to the memory, the processor configured to:
        load a configuration for a first collection of computing resources on a server including an instruction to poll a service of the first collection;
        poll the service of the first collection to determine a gate definition of the first collection in response to reading the instruction to poll the service of the first collection;
        load the gate definition of the first collection to a local cache of the server in response to the gate definition indicating a transfer of application data from the first collection to a second collection of computing resources has occurred; and
        propagate the gate definition to an application executed on a third collection of computing resources to apply a change in a status of the first collection, resulting from the transfer, to the application while the application is being executed.

9. The system of claim 8, wherein the configuration further includes a current status of the first collection and wherein the change in status resulting from the transfer of application data to the second collection updates the current status of the first collection from live to virtual.

10. The system of claim 9, wherein the application data in the collection is transferred to the second collection in the event of the first collection reaching its capacity.

11. The system of claim 9, wherein the gate definition of the first collection includes information associated with the second collection.

12. The system of claim 9, the processor further configured to:
    receive a call to the first collection; and
    re-direct the call to the second collection.

13. The system of claim 9, the processor further configured to compare the status of the first collection included in the configuration with the current status of the first collection based on the gate definition.

14. The system of claim 8, wherein the first collection includes servers, databases, application servers, and rack nodes.

15. A non-transitory computer readable medium having instructions stored thereon, execution of which, by one or more processors of a device, cause the one or more processors to perform operations comprising:
    loading a configuration for a first collection of computing resources on a server including an instruction to poll a service of the first collection;
    polling the service of the first collection to determine a gate definition of the first collection in response to reading the instruction to poll the service of the first collection;
    loading the gate definition of the first collection to a local cache of the server in response to the gate definition indicating a transfer of application data from the first collection to a second collection of computing resources has occurred; and
    propagating the gate definition to an application executed on a third collection of computing resources to apply a change in a status of the first collection, resulting from the transfer, to the application while the application is being executed.

16. The non-transitory computer-readable medium of claim 15, wherein the configuration further includes a current status of the collection and wherein the change in status resulting from the transfer of application data to the second collection updates the current status of the first collection from live to virtual.

17. The non-transitory computer-readable medium of claim 16, wherein the application data in the first collection is transferred to the second collection in the event of the first collection reaching its capacity.

18. The non-transitory computer-readable medium of claim 16, wherein the gate definition of the first collection includes information associated with the second collection.

19. The non-transitory computer-readable medium of claim 16, the operations further comprising:
    receiving a call to the first collection; and re-directing the call to the second collection.

20. The non-transitory computer-readable medium of claim 16, the operations further comprising comparing the status of the first collection included in the configuration with the current status of the first collection based on the gate definition.

* * * * *